No. 620,717. Patented Mar. 7, 1899.
J. P. MOORE.
SPRING TRIP FOR CULTIVATORS.
(Application filed Jan. 21, 1898.)
(No Model.)
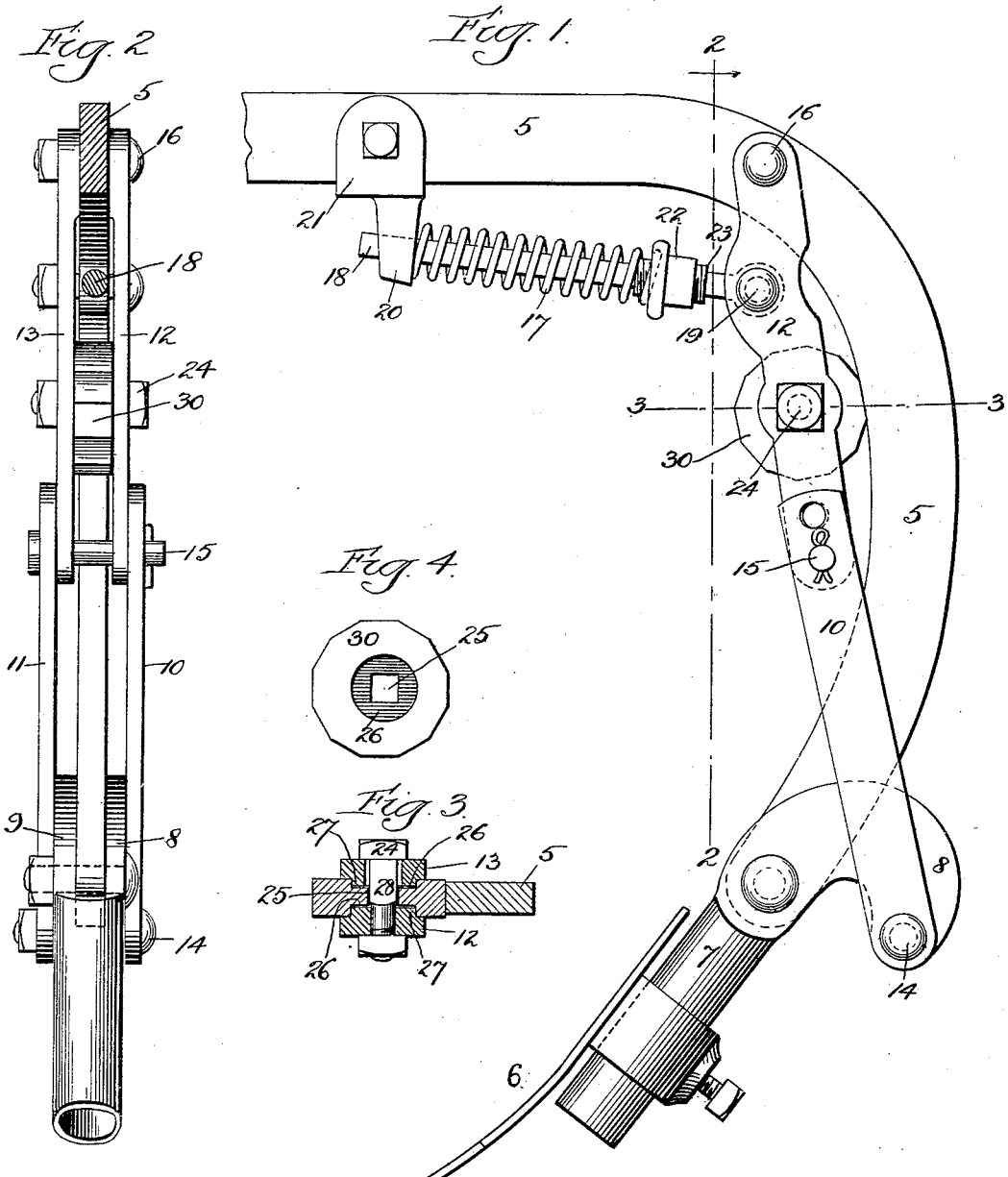
Witnesses
Wm. J. Henning
H. A. Gilden
Inventor
Joseph P. Moore,
by Bond Adams Pickard Jackson.
Attys

UNITED STATES PATENT OFFICE.

JOSEPH P. MOORE, OF MONMOUTH, ILLINOIS, ASSIGNOR TO THE PATTEE PLOW COMPANY, OF SAME PLACE.

SPRING-TRIP FOR CULTIVATORS.

SPECIFICATION forming part of Letters Patent No. 620,717, dated March 7, 1899.

Application filed January 21, 1898. Serial No. 667,513. (No model.)

*To all whom it may concern:*

Be it known that I, JOSEPH P. MOORE, a citizen of the United States, residing at Monmouth, in the county of Warren and State of Illinois, have invented certain new and useful Improvements in Spring-Trips for Cultivators and other Agricultural Implements, of which the following is a specification, reference being had to the accompanying drawings.

My invention relates to spring-trips, and has for its object to provide a new and improved spring-trip which will be provided with means for adjusting the trip, so that the force necessary to operate or "break" it may be regulated as desired.

A further object is to improve spring-trips generally.

I accomplish these objects as hereinafter specified and as illustrated in the drawings.

That which I regard as new will be set forth in the claims.

In the accompanying drawings, Figure 1 is a side elevation of a part of a cultivator-beam, illustrating my improvements. Fig. 2 is a vertical section on line 2 2 of Fig. 1. Fig. 3 is a cross-section on line 3 3 of Fig. 1, and Fig. 4 is a side view of the adjusting-disk.

Referring to the drawings, 5 indicates the cultivator-beam, and 6 the shovel. The shovel 6 is secured to the beam 5 by a sleeve 7, which is pivoted to the lower end of said beam and is provided with backwardly-curved arms 8 9, as shown in Figs. 1 and 2.

10 11 indicate the lower members of a toggle, of which 12 13 are the upper members. The lower members 10 11 are pivoted at their lower ends, respectively, to the arms 8 9, and their upper ends are pivoted, respectively, to the upper members 12 13 of the toggle. Bolts 14 15 serve to make these connections and are detachable, so that the parts may be readily disconnected from each other. The upper members 12 13 of the toggle are pivoted by a bolt 16 to the upper portion of the beam 5, as shown in Figs. 1 and 2.

17 indicates a spring which is mounted upon a rod 18, pivotally connected at one end to a bolt 19, secured to the upper members 12 13 of the toggle, as shown in Fig. 1. The other end of the rod 18 passes through a suitable bearing 20 in a bracket 21, which is secured to the beam 5 at a point forward of the bolt 16, as shown in Fig. 1.

22 indicates a collar upon the rod 18 near its rear end, said collar being adjustable upon screw-threads 23, as shown. The forward end of the spring 17 bears against the bracket 20, which forms a stop for it.

It will be noted from the above description that when the toggle members swing forward upon their pivots the spring 17 will be compressed and will tend to restore said toggle members to their former position. It will also be noted that when the bolt 15 lies forward of a line drawn between the bolts 14 16, which connect the members of the toggle to the shovel standard and beam, respectively, the shovel may be thrown backward, thereby throwing the bolt 15 forward and compressing the spring 17, and the force necessary to throw the shovel backward or break the trip is dependent upon the position of the bolt 15 with reference to a line drawn between the bolts 14 and 16, as the nearer the bolt 15 is to such a line the greater the power required to break the trip.

For the purpose of adjusting the position of the bolt 15 and regulating the trip a stop is provided, which limits the backward movement of the toggle members. In its most approved form such stop consists of a disk 30, having a plurality of faces at different distances from the pivotal center thereof, as illustrated in Fig. 4. This disk is secured between the upper members 12 13 of the toggle, it being mounted upon a bolt 24, as shown in Figs. 1 and 3, in such a manner as to be adapted to bear against the inner edge of the beam 5 when the toggle is in its normal position. In order to properly secure said disk upon its bolt, it is provided with a square or irregular hole 25 and with circular recesses 26, into which fit annular bosses 27, projecting from the adjacent toggle members 12 13, as illustrated in Fig. 3. The bolt 24 is provided with a squared or irregular portion 28, which fits the hole 25 of the disk 30, so that when the bolt 24 is turned the disk will turn with it. The hole in the toggle member 13, through which the bolt 24 passes, is large enough to permit said bolt to turn.

By the construction above described the bolt 24 serves to tightly bind the disk 30 between the toggle members 12 13, so that when adjusted to the proper position the disk is fixedly secured to said toggle members. When it is desired to adjust the disk to regulate the force necessary to break the trip, all that is necessary is to loosen the nut of the bolt 24, when the disk may be partially rotated to secure the desired adjustment and then again tightly secured in position.

Inasmuch as the hole 25 in the disk 30 is eccentrically placed the extent to which the toggle may be moved back toward the beam 5 may be varied within certain limitations, and consequently the position of the bolt 15 with reference to a line drawn between the bolts 14 and 16 may be adjusted and the force necessary to break the trip regulated. By using disks 30 of different sizes or of different degrees of eccentricity the adjustment of the spring-trip may be further regulated.

I have described my improvements in detail; but I do not wish to be limited to the specific details of construction set forth, as various modifications may be made without departing from my invention.

That which I claim as my invention, and desire to secure by Letters Patent, is—

1. In a spring-trip, the combination with a toggle, of a disk eccentrically carried by one of the members thereof and adapted to operate as a stop to regulate the normal position of the toggle, and a bolt or pin which engages said disk and rotates therewith for adjusting it, substantially as described.

2. In a spring-trip, the combination with a toggle having bars 12 13, of a disk mounted eccentrically between said bars and on journals located, respectively, on inner opposite sides thereof, said disk operating as a stop to regulate the normal position of the toggle, substantially as described.

3. In a spring-trip, the combination with a toggle having bars 12 13, of a disk mounted eccentrically between said bars and operating as a stop to regulate the normal position of the toggle, said bars forming a bearing at each side for said disk, and a bolt which engages said disk non-rotatably for adjusting it, substantially as described.

4. The combination of bars 12 13, a disk 30 adapted to be secured between said bars, and a bolt 24 passing through said bars and said disk, said disk having a non-circular portion adapted to receive the correspondingly-shaped portion of said bolt, said disk being eccentrically mounted upon said bolt and having a plurality of faces, substantially as described.

5. The combination with bars 12 13 having bosses 27, of a disk 30 having recesses 26 adapted to receive said bosses, said disk having a non-circular hole 25, and a bolt 24 having a non-circular portion 28 adapted to fit in the hole 25, said disk being eccentrically mounted upon said bolt and having a plurality of faces, substantially as described.

JOSEPH P. MOORE.

Witnesses:
   CHAS. A. PERLEY,
   ISAIAH S. WOLF.